United States Patent
Albertin et al.

(10) Patent No.: US 6,746,353 B2
(45) Date of Patent: Jun. 8, 2004

(54) GUIDE BAR, CHAIN INCORPORATING SUCH A BAR AND ENGINE EQUIPPED WITH SUCH A CHAIN

(75) Inventors: Jean-Louis Albertin, Brezins (FR); Jean-Luc Teruel, Bourgoin Jallieu (FR); Jean-Paul Lethy, Viriville (FR)

(73) Assignee: Sachs Automotive France SA, Saint Simeon de Bressieux (FR)

( * ) Notice: Subject to any disclaimer, the term of this patent is extended or adjusted under 35 U.S.C. 154(b) by 35 days.

(21) Appl. No.: 10/112,038

(22) Filed: Apr. 1, 2002

(65) Prior Publication Data

US 2003/0181274 A1 Sep. 25, 2003

(30) Foreign Application Priority Data

Mar. 21, 2002 (FR) .............................. 02 03560

(51) Int. Cl.$^7$ ............................... F16G 13/04
(52) U.S. Cl. ...................... 474/212; 474/201
(58) Field of Search ................ 474/201, 212, 474/213, 214, 215, 216, 217, 232

(56) References Cited

U.S. PATENT DOCUMENTS

| | | | | |
|---|---|---|---|---|
| 1,269,656 A | * | 6/1918 | Stewart | 474/213 |
| 2,266,686 A | * | 12/1941 | Keller | 474/201 |
| 5,318,485 A | * | 6/1994 | Bateman | 474/245 |
| 5,445,570 A | * | 8/1995 | White | 474/213 |
| 6,171,209 B1 | | 1/2001 | Matsuda | |

FOREIGN PATENT DOCUMENTS

| | | |
|---|---|---|
| EP | 0937910 | 8/1999 |
| EP | 1072816 | 7/2000 |

* cited by examiner

*Primary Examiner*—David A. Bucci
*Assistant Examiner*—Vicky A. Johnson
(74) *Attorney, Agent, or Firm*—Dowell & Dowell, P.C.

(57) ABSTRACT

This invention relates to a guide bar for a drive chain, provided with two orifices for passage of a pintle pin, each orifice being substantially triangular in shape, with substantially identical edges, in the form of arc of circle and concave. The bar is provided with a recess which extends, from an outer edge of the bar, in the direction of an opposite edge, between the afore-mentioned orifices. The bar comprises, on either side of the recess, two series of two convex edges in the form of an arc of circle, each of these convex edges being centred on the geometrical centre of one of the concave edges of a triangular orifice.

22 Claims, 2 Drawing Sheets

GUIDE BAR, CHAIN INCORPORATING SUCH A BAR AND ENGINE EQUIPPED WITH SUCH A CHAIN

FIELD OF THE INVENTION

1. Background of the Invention

The present invention relates to a guide bar, to a chain comprising such a bar, and to an engine equipped with such a chain.

2. Brief Description of the Related Art

A drive chain may be used for the transmission of a movement and, in particular, for the synchronization of the elements constituting a timing system in an internal combustion engine of an automobile vehicle.

It is known from EP-A-1 072 816 to provide, in a drive chain guide bar, a recess which extends from an outer edge of the bar in the direction of the opposite edge, between orifices for passage of pins for articulation of this bar with other, so-called inner bars, used for constituting the links of the chain.

The known outer, or guide bar of EP-1 072 816 functions correctly, but is relatively heavy, which has a negative influence on its inertia and on the dynamic behaviour of a chain comprising a large number of such bars. In addition, the tools for manufacturing such an outer bar must be produced by a plurality of machining operations, involving the corresponding manipulations. This results in risks of error during the machining and control operations.

It is a more particular object of the present invention to overcome these drawbacks by proposing a guide bar for a drive chain of the afore-mentioned type, whose sequence of manufacture may be optimalized, while it presents excellent mechanical properties and an inertia compatible with relatively great accelerations, for example at the level of a sprocket of a timing system in an engine.

SUMMARY OF THE INVENTION

To that end, the invention relates to a guide bar for a drive chain, this bar being provided with two orifices for passage of a pintle pin, each orifice being substantially triangular in shape, with substantially identical edges, in the form of an arc of circle and concave, this bar being provided with a recess which extends from an outer edge of the bar, in the direction of an opposite edge, between these orifices. This bar is characterized in that it comprises, on either side of the afore-mentioned recess, two series of two convex edges in the form of arc of circle, each of these convex edges being centred on the geometrical centre of a concave edge of a triangular orifice for passage of a pintle pin.

Thanks to the invention, the same geometrical centre is used for defining one of the concave edges of an orifice for passage of a pintle pin and one of the convex edges of the bar in the vicinity of this orifice, which makes it possible to produce tools for cutting out these edges by machining, without having to displace the blank of the tool during manufacture. In the same way, the operations of dimensional control of these tools and of these edges may be effected by taking the same point of reference.

According to advantageous but non-obligatory aspects of the invention, this bar incorporates one or more of the following characteristics:

The bar forms, between one of its convex edges and the concave edge of the adjacent orifice centred on the same geometrical centre, a band in the form of a section of ring, centred on the same geometrical axis and of substantially constant width. This band makes it possible effectively to withstand the mechanical stresses undergone by the bar, particularly when the pintle pin is fitted and then shrunk in the orifice of substantially triangular section.

Depending on the case, the common geometrical centre may be located in the vicinity of the outer edge of the bar or between the triangular orifice and a median axis of the bar, located half-way between the two triangular-section orifices.

The radii of curvature of the convex edges of the bar arranged on the same side of the recess are substantially equal.

A transition edge is provided, arranged between two convex edges formed on the same side of the recess, this transition edge likewise being circular and convex and having a smaller radius of curvature than the respective radii of curvature of the two convex edges between which it is arranged.

A transition edge is provided, arranged between one of the convex edges of the bar and the edge of the afore-mentioned recess, this transition edge likewise being circular and convex and having a smaller radius of curvature than that of the afore-mentioned convex edge.

The afore-mentioned transition edge is tangential to the edges between which it is arranged. In addition, the radius of curvature of the transition edges may be provided to have a value equal to $\underline{e}+0.365$ mm, where $\underline{e}$ is the thickness of the bar.

The invention also relates to a chain which comprises at least one outer, or guiding, bar as described hereinabove. Such a chain may be used under severe conditions, while it is relatively easy to manufacture, with satisfactory tolerances, and the mechanical stresses due to the shrinking of the pins fitted in the triangular-section orifices are distributed substantially uniformly in the material constituting these outer bars.

Finally, the invention relates to an engine, particularly an internal combustion engine, equipped with a chain as described hereinabove. Such an engine functions under optimalized conditions of transmission of the efforts of traction of the chain.

BRIEF DESCRIPTION OF THE DRAWINGS

The invention will be more readily understood on reading the following description of an embodiment of a chain in accordance with its principle, given solely by way of example, and with reference to the accompanying drawings, in which.

DESCRIPTION OF PREFERRED EMBODIMENT

Figure 1:
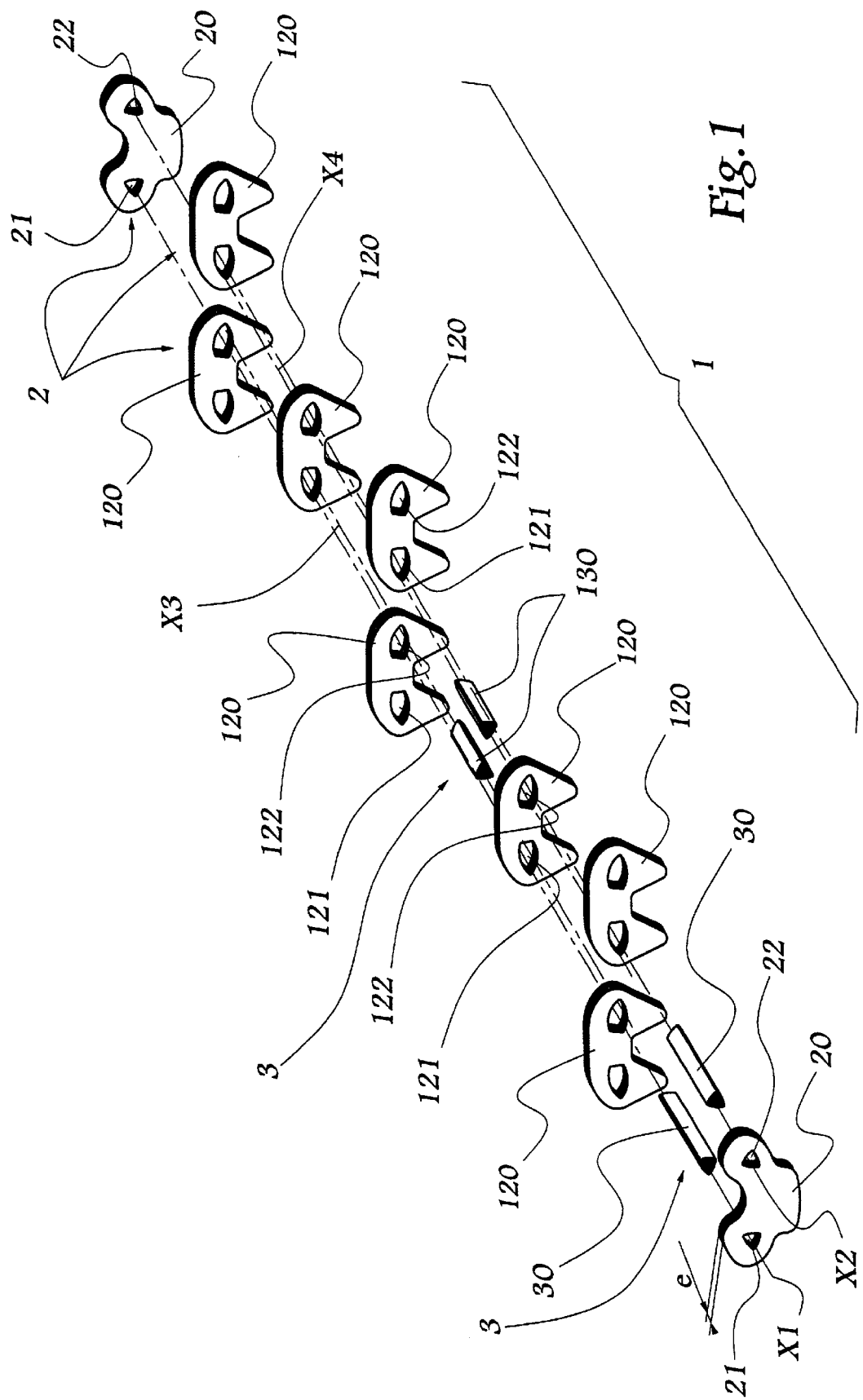
FIG. 1 schematically shows a portion of a chain according to the invention, in an exploded perspective view.

Referring now to the drawings, the chain 1 shown in FIG. 1 is intended to be used in an internal combustion engine of an automobile vehicle. It is formed by bars 2 and pins 3 adapted to be assembled together. More precisely, the bars 2 are distributed into guiding, or outer bars 20 and into intermediate, or inner bars 120. The pins 3 may be long pins 30, intended to cooperate with bars 20 and 120, or short pins 130 intended to cooperate solely with bars 120.

The guide bars 20 are each provided with two orifices 21 and 22 for passage of a pin 30. The bars 120 are each provided with two orifices 121 and 122 in which both a pin 30 and a pin 130 can be received at the same time.

Geometrical axes $X_1$ and $X_2$ represent the position of the geometrical axis of a pin 30 received in orifices 21 or 22 when the chain is in mounted configuration. Geometrical axes $X_3$ and $X_4$ represent the position of the geometrical axis of pins 130 received in the orifices 121 and 122 of the bars 120 when the chain is in mounted configuration.

Otherwise, the chain 1, which extends in a direction perpendicular to axes $X_1$ to $X_4$, functions as described in EP-A-1 072 816.

Figure 2:
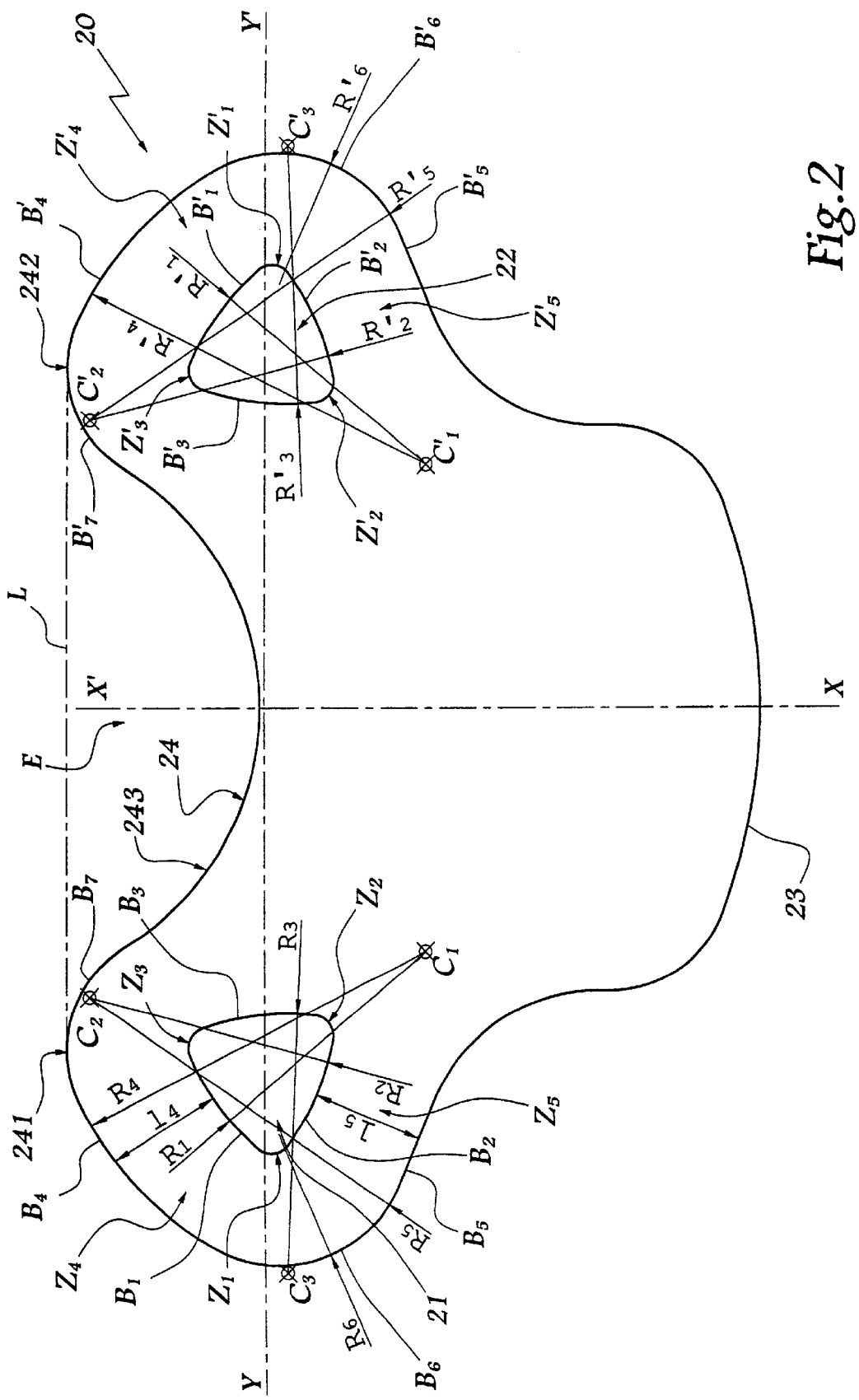
FIG. 2 is a front view, on a larger scale, of a guide bar used in the chain of FIG. 1.

The bar 20 shown in FIG. 2 is made from a sheet metal plate. It might also be made by stacking elementary bars all having substantially the same thickness, these elementary bars in that case being made of sheet metal and being pre-treated, for example hardened, in order to improve their resistance.

Each orifice 21 or 22 is substantially triangular in shape. The orifice 21 is thus defined by three edges $B_1$, $B_2$ and $B_3$ in the form of arc of circle and whose concavity faces the inside of the orifice 21. $C_1$, $C_2$ and $C_3$ respectively denote the geometrical centres of edges $B_1$, $B_2$ and $B_3$.

The radii of curvature $R_1$, $R_2$ and $R_3$ of edges $B_1$, $B_2$ and $B_3$ have the same value.

Rounded connection zones $Z_1$, $Z_2$ and $Z_3$ are respectively provided between the edges $B_1$, $B_2$ and $B_3$, with smaller radii of curvature than radii $R_1$ to $R_3$.

23 denotes the edge of the bar 20 intended to be oriented towards the centres of curvature of the trajectory of the chain 1. In other words, the edge 23 constitutes the inner edge of the bar 20 oriented towards the centre of the sprockets with which the chain 1 cooperates. This edge is curved and its concavity is oriented in the direction of orifices 21 and 22.

24 denotes the outer edge of the bar 20, i.e. its edge opposite edge 23. The edge 24 is intended to be oriented opposite the centres of curvature of the trajectory of the chain 1.

X–X' denotes a median axis of the bar 20. Y–Y' denotes an axis perpendicular to axis X–X' and passing through the centres of the orifices 21 and 22. 241 and 242 respectively denote those parts of the edge 24 most remote from the axis Y–Y', these parts being respectively arranged at the level of the orifices 21 and 22. L denotes an imaginary line joining parts 241 and 242.

A recess E is formed at the level of edge 24, in that the edge 24 is concave and located on the same side of line L, on either side of axis X–X'. The recess E makes it possible substantially to lighten the bar 20 with respect to the case of the edge 24 being substantially aligned with the line L, without weakening the mechanical strength of the bar 20. At the level of recess E, the edge 24 is symmetrical with respect to axis X–X'.

$B_4$ denotes the edge of the bar 20 beyond part 241 with respect to axis X–X'.

$B_5$ denotes the edge of the bar 20 below the orifice 21 in FIG. 2.

The edge $B_4$ is in the form of an arc of circle centred on point $C_1$. $R_4$ denotes the radius of edge $B_4$.

As for edge $B_5$, it is in the form of an arc of circle centred on point $C_2$. $R_5$ denotes its radius.

Radii $R_4$ and $R_5$ have the same value.

As the edges $B_4$ and $B_5$ are centred on the geometrical point $C_1$, they may be obtained by cutting out a blank by means of tools of the punch and die type of which the corresponding edges are obtained by machining virtually at the same time, without manipulation or displacement of the punch or of the die during manufacture, which improves precision of manufacture and of the subsequent control. In the same way, as the edges $B_2$ and $B_5$ are centred on the same point $C_2$, they may be produced by other parts of the die and punch obtained without excessive manipulation, hence a reduction in the risks of error in the operations of machining of these tools and of control.

A transition edge $B_6$ is arranged between the edges $B_4$ and $B_5$ and with a radius of curvature $R_6$ whose length is equal to the thickness $\underline{e}$ of the rod 20 increased by 0.365 mm. The edge $B_6$ is tangential to the edges $B_4$ and $B_5$.

In the same way, a transition edge $B_7$ is arranged between the edge $B_4$ and the part 243 of the edge 24 constituting the limit of the recess E. The transition edge $B_7$ which is circular like the edge $B_6$, has a radius of curvature $R_7$ whose length is equal to that of the radius $R_6$. The edge $B_7$ is tangential to the edge $B_4$ and to part 243 of the edge 24.

Taking the foregoing into account, there is defined between the edges $B_1$ and $B_4$ a zone $Z_4$ in the form of a sector of ring centred on point $C_1$. In the same way, there is defined between the edges $B_2$ and $B_5$ a zone $Z_5$, likewise in the form of a sector of ring, but centred on point $C_2$.

$L_4$ and $L_5$ respectively denote the width of the zones $Z_4$ and $Z_5$. The widths $L_4$ and $L_5$ are equal and, in practice, their value is chosen as a function of the thickness $\underline{e}$ of the bar 20.

Thanks to the characteristics mentioned above, the mechanical stresses around the orifice 21 can be uniformly distributed, such stresses resulting from the shrinking of a pin 30 in this orifice. In fact, it is essential that these stresses be efficiently distributed in order to avoid an offset of the orifice 21 along the axis X–X' or perpendicularly thereto, which might have an influence on the real pitch of the links of the chain 1. In addition, a good distribution of the efforts due to the shrinking makes it possible to avoid incipient ruptures at the level of the zones of connection $Z_1$, $Z_2$ and $Z_3$ between the edges of the orifice 21.

The geometry of the bar 20 at the level of and around the orifice 22 is symmetrical to that described hereinabove with reference to the orifice 21, which enables the same advantages to be obtained.

$B'_1$ to $B'_3$ denote the edges of the orifice 22, $C'_1$ to $C'_3$ their geometrical centres and $R'_1$ to $R'_3$ their radii. $B'_4$ and $B'_5$ denote the convex edges in arc of circle form of the bar 20 around the orifice 22. These edges $B'_4$ and $B'_5$ are respectively centred on the points $C'_1$ and $C'_2$.

$R'_4$ and $R'_5$ denote the radii of the edges $B'_4$ and $B'_5$. Transition edges $B'_6$ and $B'_7$ are respectively defined between the edges $B'_4$ and $B'_5$, on the one hand, and between the edge $B'_4$ and the part 243 of the edge 24. Two zones $Z'_4$ and $Z'_5$ are defined between the edges $B'_1$ and $B'_4$, on the one hand, $B'_2$ and $B'_5$ on the other hand, with the same characteristics as the zones $Z_4$ and $Z_5$.

The invention therefore makes it possible to optimalize the mechanical properties of the bar 20, while its mass and its inertia are reduced to a maximum.

What is claimed is:

1. Guide bar for a drive chain, said bar being provided with two spaced orifices for passage of a pintle pin, each orifice being substantially triangular in shape and defined by three substantially identical edges, each in a form of an arc of circle and concave, said bar being provided with a recess intermediate said orifices which extends from a first outer edge of said bar in a direction toward an opposite edge of said bar which is between said orifices, wherein said bar comprises, on either side of said recess, two series of two convex edges each in a form of arc of circle, each of said convex edges being centered on a geometrical center of one of said concave edges of an adjacent orifice.

2. The bar of claim 1, wherein said bar forms, between one of said convex edges and one of said concave edges of the adjacent orifice centered on the same geometrical center, a band in a form of a sector of a ring, centered on said geometrical center and of substantially constant width.

3. The bar of claim 1, wherein said geometrical centers are in a vicinity of said first outer edge of said bar.

4. The bar of claim 1, wherein said geometrical centers are between said triangular orifices and a median axis (X–X') of said bar.

5. The bar of claim 1, wherein a radii of curvature of said two convex edges on a same side of said recess, are substantially equal.

6. The bar of claim 1, including a transition edge arranged between one of said convex edges of said bar and an edge of said recess, said transition edge being in a form of an arc of a circle and convex and having a smaller radius of curvature than that of said convex edges of said bar.

7. The bar of claim 1, including a transition edge between said two convex edges formed on same sides of said recesses, said transition edges being in a form of an arc of a circle and convex and having a smaller radius of curvature than respective radii of curvature of two convex edges between which said transition edges extend.

8. The bar of claim 7, wherein said transition edges are tangential to edges between which said transition edges extend.

9. The bar of claims 7, wherein the radii of curvature of said transition edges have a value equal to e +0.365 mm, where e is a thickness of said bar.

10. Chain incorporating at least one guide bar according to claim 1.

11. Engine for automobile vehicle equipped with a chain according to claim 10.

12. Guide bar for a drive chain, said bar being provided with two spaced orifices for passage of a pintle pin, each orifice being substantially triangular in shape and defined by three substantially identical edges, each in a form of an arc of circle and concave, said bar being provided with a recess intermediate said orifices which extends from a first outer edge of said bar in a direction toward an opposite edge of said bar which is between said orifices, wherein said bar comprises, on either side of said recess, two series of two convex edges each in a form of arc of circle, each of said convex edges being centered on a geometrical center of one of said concave edges of an adjacent orifice and outside the adjacent recess.

13. The bar of claim 12, wherein said bar forms, between one of said convex edges and one of said concave edges of the adjacent orifice centered on the same geometrical center, a band in a form of a sector of a ring, centered on said geometrical center and of substantially constant width.

14. The bar of claim 12, wherein said geometrical centers are in a vicinity of said first outer edge of said bar.

15. The bar of claim 12, wherein said geometrical centers are between said triangular orifices and a median axis (X–X') of said bar.

16. The bar of claim 12, wherein a radii of curvature of said two convex edges on a same side of said recess, are substantially equal.

17. The bar of claim 12, including a transition edge arranged between one of said convex edges of said bar and an edge of said recess, said transition edge being in a form of an arc of a circle and convex and having a smaller radius of curvature than that of said convex edges of said bar.

18. The bar of claim 12, including a transition edge between said two convex edges formed on same sides of said recesses, said transition edges being in a form of an arc of a circle and convex and having a smaller radius of curvature than respective radii of curvature of two convex edges between which said transition edges extend.

19. The bar of claim 18, wherein said transition edges are tangential to edges between which said transition edges extend.

20. The bar of claim 18, wherein the radii of curvature of said transition edges have a value equal to e +0.365 mm, where e is a thickness of said bar.

21. Chain incorporating at least one guide bar according to claim 12.

22. Engine for automobile vehicle equipped with a chain according to claim 21.

* * * * *